United States Patent [19]

Moore, Jr.

[11] Patent Number: 4,836,089
[45] Date of Patent: Jun. 6, 1989

[54] SERIES SPOOL PRESSURE REGULATOR ARRANGEMENT FOR A DOUBLE-ACTING HYDRAULIC ACTUATOR

[75] Inventor: Robert G. Moore, Jr., Granger, Ind.

[73] Assignee: Allied-Signal Inc., Morristown, N.J.

[21] Appl. No.: 108,889

[22] Filed: Oct. 16, 1987

[51] Int. Cl.$^4$ .................. F15B 13/042; F16K 31/122
[52] U.S. Cl. ...................................... 91/446; 91/468; 91/165; 137/116.3; 137/505.26
[58] Field of Search .................. 91/31, 51, 52, 165, 91/166, 426, 433, 446–448, 468, 532, DIG. 2, 461; 137/116.3 X, 505.11, 505.26

[56] References Cited

U.S. PATENT DOCUMENTS

| | | | |
|---|---|---|---|
| 3,665,810 | 5/1972 | Parrett | 91/447 X |
| 3,884,254 | 5/1975 | Kogure | 137/116.3 X |
| 3,920,040 | 11/1975 | Powell | 137/461 X |
| 4,112,825 | 9/1978 | Murata | 137/116.3 X |
| 4,244,275 | 1/1981 | Smilges | 91/447 X |
| 4,537,220 | 8/1985 | Anderson | 91/433 X |
| 4,590,968 | 5/1986 | Wolfges | 91/433 X |
| 4,748,896 | 6/1988 | Ott et al. | 91/448 |

Primary Examiner—Robert E. Garrett
Assistant Examiner—George Kapsalas
Attorney, Agent, or Firm—Leo H. McCormick, Jr.; Ken C. Decker

[57] ABSTRACT

A regulator arrangement (14) for a servo system (10) having a first stage valve spool piston (44) for developing a primary operational fluid ($P_c$) and a second stage valve spool piston (70) for developing secondary operational fluid $P_{cr}$ having a constant fluid pressure. A control valve (109) selectively connects a first chamber (100) of a cylinder housing bore to either the primary operational fluid pressure $P_c$ or a reference fluid pressure $P_B$ to develop a fluid pressure $P_x$ in first chamber (100) while a second chamber (102) is connected to the secondary operational fluid ($P_{cr}$). A load piston (96) responds to a pressure differential ($P_x - P_{cr}$) by moving to either expand or contract the second chamber (102) and produce a fluid pressure ($P_{crx}$) in the secondary operational fluid. The fluid pressure $P_{crx}$ is communicated to the second valve piston (70) to correspondingly allow either additional primary fluid ($P_c$) to flow to the secondary chamber (102) or release secondary operational fluid until the secondary operational fluid pressure returns to $P_{cr}$.

7 Claims, 3 Drawing Sheets

SERIES SPOOL PRESSURE REGULATOR ARRANGEMENT FOR A DOUBLE-ACTING HYDRAULIC ACTUATOR

BACKGROUND OF THE INVENTION

1. FIELD OF THE INVENTION

This invention relates to a regulator arrangement for a servo system whereby secondary operational fluid is maintained at a substantially constant fluid pressure by a throttling valve selectively connected to either a primary operational fluid or a reference fluid to either increase or lower the fluid pressure in the servo system.

2. DECRIPTION OF THE PRIOR ART

Pressure regulators such as disclosed in U.S. Pat. No. 3,463,182 are designed to maintain a constant pressure drop across a valve arrangements. This type regulator was designed for use in space vehicles and operates under conditions where the input operational fluid has a relatively low fluid pressure.

Where higher fluid pressures are experienced, a spring, as disclosed in U.S. Pat. No. 3,920,040, is added to the valve arrangement to assure that some minimum or maximum fluid pressure is maintained in the system.

However, for some applications it is important that the operational fluid be maintanined at a substantially constant fluid pressure rather than within a select high or select low range.

SUMMARY OF THE INVENTION

The regulator arrangement in the present invention has a valve arrangement in which a feedback from a load is used to maintain a substantially constant pressure drop across a throttling valve. A first piston responds to a first stage fluid reduction produced by a pressure differential acting on a first diameter surface in opposition to a first spring to produce a primarily operational fluid. A second piston has first and second grooves separated by a first land. A second spring acts on the second piston and positions the first groove with respect to a first seat to restrict the flow of the primary fluid through an entrance port and establish a secondary operational fluid having a pressure $P_{cr}$. A control member responsive to an operational input selectively communicates the primary operational fluid or a reference fluid to a first chamber in a load member to create a fluid pressure $P_x$. A movable wall in the load member separates the first chamber from a second chamber connected to receive the secondary operational fluid having a fluid pressure $P_{cr}$. A pressure differential $(P_x - P_{cr})$ moves the movable wall to produce a fluid pressure $P_{crx}$ in the second chamber. This fluid pressure $P_{crx}$ is communicated to the second piston and acts thereon to either allow additional primary operational fluid $P_c$ to flow through the first groove or allow secondary operational fluid to flow through the second groove and return the fluid pressure of the secondary fluid to $P_{cr}$.

It is an object of this invention to provide a servo system with a regulator arrangement whereby secondary operational fluid is maintained at a substantially constant fluid pressure.

It is further object of this invention to provide a regulator arrangement with a first stage piston arrangement to produce primary operational fluid and a second stage piston arrangement to produce secondary operational fluid. A feedback from a load member acts on the second stage piston arrangement to add primary operational fluid or release secondary operational fluid from the second stage piston to maintain the fluid pressure in the second stage at a substantially constant fluid pressure.

An advantage of this invention occurs through the use of a single valve which meters and throttles to regulate and maintain the fluid pressure of a secondary operational fluid at a substantially constant fluid pressure.

BRIEF DESCRIPTION OF THE DRAWINGS

These advantages and objects should be apparent from reading this specification while viewing the drawings wherein.

Figure 1:
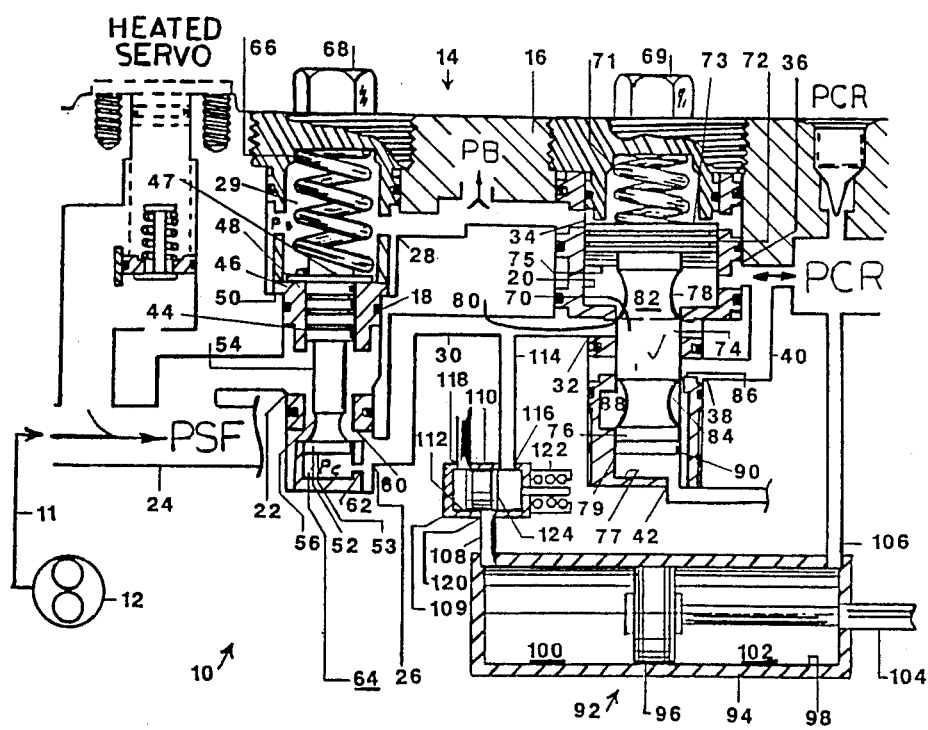
FIG. 1 is sectional view of the regualtor arrangement for a servo system made according to the principles of the invention.

The servo system 10 shown in FIG. 1 includes a high pressure pump 12 which supplies fluid to a metering valve, not shown for operating a turbine engine, not shown. Many components in a turbine fuel system are operated by a portion of the output from high pressure pump 12. Since the fluid requirement of turbine engine can vary as a function of operator input, it is necessary to include a regulator arrangement 14 in the servo system 10 to provide for smooth operation of the components.

The regulator arrangement 14 includes a housing 16 having a first bore 18 and second bore 20. The first bore 18 has supply port 22 connected to conduit 24 from pump 12, an outlet port 26 and a reference port 28. The second bore 20 has and entrance port 32 connected to conduit 30 coming from outlet port 26, a first reference port 34, and outlet port 36 connected to various components in the servo system 10 of the turbine engine, a bypass port 38 connected by conduit 40 to outlet port 36, and a second reference port 42.

A first piston 44 located in bore 18 has a first diameter section 46 with a rib 48 that engages a shoulder 50 and a second diameter 52 connected by a stem 54. The stem 54 has a groove 56 located adjacent the second diameter section 52 to form a variable area with an annular seat 60 of the outlet port 26. A restricted orifice 62 connects the outlet port 26 with operational chamber 64.

A spring 66 held in bore 18 by end cap 68 acts on the first diameter 46 of piston 44 to urge rib 48 toward shoulder 50 and establish the size of the opening from bore 18 into outlet port 26.

A second piston 70 located in bore 20 has a large diameter section 72 which separates the reference port 34 from the outlet port 36, a first land 74 and a second land 76. A first groove 78 located between the first land 74 and first diameter section 72 is matched with an annular seat 80 to establish a variable area from the entrance port 32 into chamber 82 in bore 20 while a second groove 84 located between the first land 74 and the second land 76 is matched with an annular seat 86 to establish a variable discharge area from bypass port 38 into chamber 88. Chamber 88 is connected to reference port 42 by a slot 90 in either the second land 76 or bore 20. A spring 71 acts on the face 73 of the large diameter 72 of piston 70 and urges the second land 76 toward a stop 77. End cap 69 holds spring 71 in bore 20.

Many components use the secondary operational fluid that is controlled by the regulator 14. A typical component is illustrated by load member 92. Load member 92 has a housing 94 with a piston 96 located in a bore 98 to define a movable wall which separates a first chamber 100 from a second chamber 102. Linkage 104 extends through the housing 94 is provides an operational force for moving a member (not shown). Conduit 106 connects outlet port 36 with chamber 102 while chamber 100 is connecte to port 120 of a control member 109 by conduit 108.

Control member 109 has a housing 110 with a bore 112. Port 116 of bore 112 is connected to conduit 30 by conduit 114 while port 118 is connected to a reference fluid of housing 16. A solenoid 122 has a plunger 124 that is moved by an operational signal to selectively connect either port 116 or 118 with the outlet port 120 to supply chamber 100 with primary operational fluid or reference fluid.

MODE OF OPERATION OF THE INVENTION

When pump 12 is in operation, fluid is supplied by conduit 11 to a fuel control system. A portion of the supply fluid is diverted through conduit 24 to the regulator arrangement 14. Initially spring 66 holds the first piston 44 in the position shown in FIG. 1 to establish the flow relationship between the surface of groove 56 and seat 60. As fluid flows from outlet port 26, the fluid pressure of the supply fluid is reduced from $F_s$ to $P_c$ to define the primary operational fluid.

The primary operational fluid is communicated through orifice 62 into chamber 64 and acts on face 53 of the second diameter 52. The reference fluid in the body of housing 16 is communicated through port 28 into chamber 29. The reference fluid has fluid pressure $P_B$. The pressure differential force dived from $P_c$ acting on face 53 of the second diameter 52 and $P_B$ acting on face 47 of the first diameter 46 opposes the force of spring 66 and moves groove 56 with respect to seat 60 to restrict the force of primary operational fluid into conduit 30.

Primary operational fluid in conduit 30 iss communicated to various components including load control member 109 and entrance port 34 of the second stage of the regulator arrangement 14.

Initially spring 71 urges piston 70 toward stop 77 to allow the primaryl operational fluid to flow from entrance port 32 to chamber 82 by way of groove 78 and annular seat 80. The pressure differential force derived from the fluid pressure in chamber 82 acting on face 75 and the first land 74 and the reference fluid pressure $P_B$ acting on face 73 of the first diameter 72 and face 79 of the second land 76 opposes the force of spring 71 to position the groove 78 with respect to annular seat 80. Spring 71 is selected such that the pressure $P_{cr}$ of fluid available at outlet port 36 is about one half of the primary operational fluid. When the fluid pressure of the secondary operational fluid is equal to about one half of the fluid pressure $P_c$ piston 70 is positioned a shown in FIG. 1 and land 74 to effectively prevent further flow of the operational fluid through either entrance port 32 or bypass port 38.

In response to an input signal, solenoid 122 is activated and moves of plunger 124 to either allow primary operational fluid $P_{cr}$ or reference fluid $P_B$ to flow into chamber 100.

Figure 2:
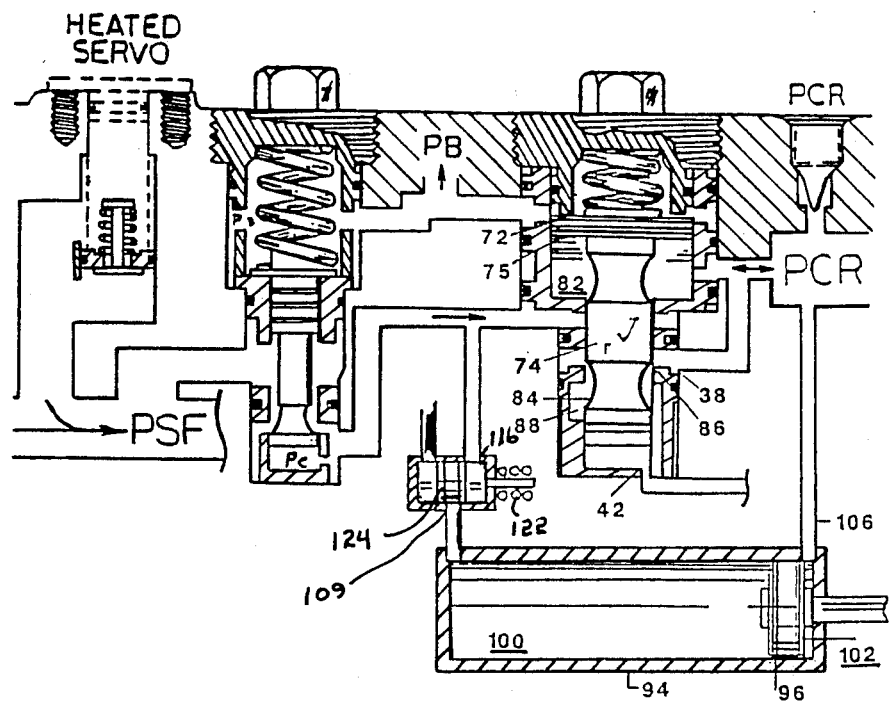
FIG. 2 is a view of the regulator arrangement showing the second valve in a position to allow the release of fluid from the secondary system.

FIG. 2 illustrates the operational conditions present when the primary operational fluid $P_{cr}$ is communicated to chamber 100. The pressure differential $P_x$-$P_{cr}$ across piston or movable wall 96 moves linkage 104 out housing 94 to compress the fluid in chamber 102 and create a fluid pressure $P_{crx}$ in the secondary operational fluid. The fluid pressure $P_{crx}$ is communicated through conduit 106 to chamber 82 and acts on face 75 to create a corresponding pressure differential $P_{crx}$-$P_B$ across the first diameter 72 of piston 70 and moves land 74 to open the bypass port 38 to allow secondary operational fluid to flow to the reference port 42 by way of groove 84 and seat 86. As the secondary operational fluid is released from chamber 88, the fluid pressure in chamber 82 is proportionally reduced and eventually returned to $P_{cr}$ to maintain the fluid pressure in the secondary operational fluid at a substantially constant level.

Figure 3:
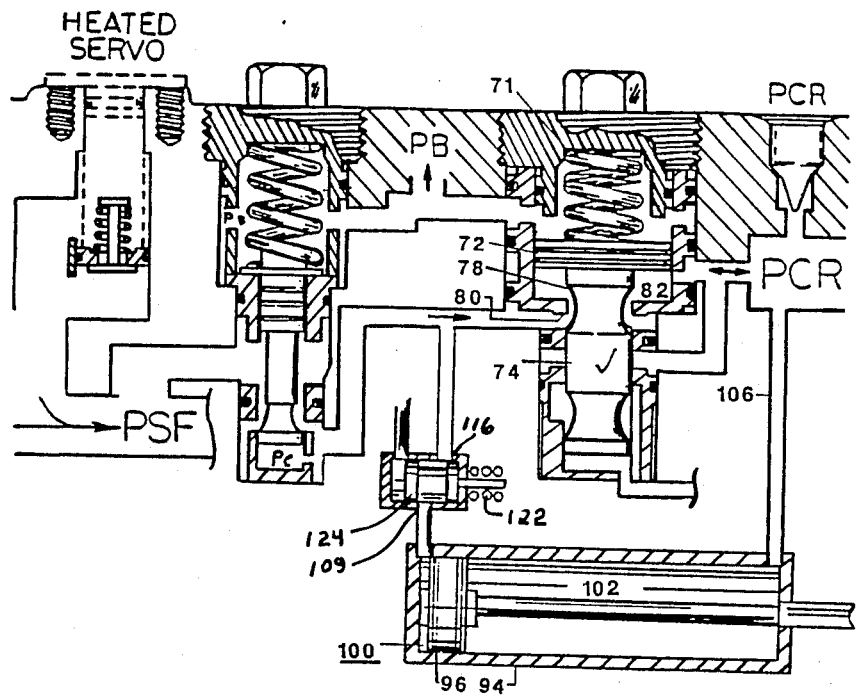
FIG. 3 in a view of the regulator arrangement showing the second valve in a position to allow additional fluid to be added to the secondary system.

FIG. 3 illustrates the situation in the regulator arrangement 14 when chamber 100 is connected to the reference fluid having a fluid pressure $P_B$. In the situation, the fluid pressure in chamber 100 is reduced to $P_x$ and the pressure differential across the movable wall or piston 96 ($P_x$-$P_{cr}$) causes the linkage to be moved into housing 94. As the piston 96 moves toward chamber 100, the fluid pressure in chamber 102 is reduced to a fluid pressure $P_{cre}$. This fluid pressure is communicated to chamber 82 by coduit 106. Since fluid pressure $P_{cre}$ is less than fluid pressure $P_{cr}$, a pressure differential across ther first diameter 72 ($P_{cre}$-$P_B$) permits spring 71 to position land 74 and allow the primary operational fluid to flow into chamber 82 by way of groove 78 and seat 80. The addition of the primary operational fluid into chamber 82 returns the fluid pressure of the secondary operational fluid to $P_{cr}$ to again position land 74 as shown in FIG. 1.

In the conclusion, the second stage of the regulator arrangement 14 rapidly seconds to changes in the fluid pressure of the secondary fluid to maintain the fluid pressure $P_{cr}$ at a substantially constant fluid pressure.

I claim:

1. A regulator arrangement for supplying a servo system with secondary operational fluid having a substantially constant fluid pressure, comprising:

a housing having a first bore and a second bore, said first bore having a supply port connected to a source of fluid having a fluid pressure $P_{(s)}$ and a first outlet port, said second bore having an entrance port connected to said first outlet port and a second outlet port connected to said servo system, said first and second bores having first and second reference ports connected to a reference fluid having a fluid pressure $P_{(B)}$, and said second bore having a bypass port connected to said second outlet port;

first piston means located in said first bore having a first diameter section for separating said supply port from said first reference port and a second diameter section for separating said supply port from said first outlet port;

first resilient means opposing the movement of said first piston means by a first pressure differential force produced across said first piston means to position a first surface on said second diameter section with respect to a first seat and thereby regulate the flow of the supply fluid through said first outlet port to produce primary operational fluid having a fluid pressure $P_c$;

second piston means located in said second bore, said second piston means having a third diameter section for separating said second outlet port from said second reference port, a first groove located between a first land and said third diameter section and a second groove between the first land and a second land;

a second resilient means for positioning said second piston means to allow primary operational fluid to flow through said entrance port to said second outlet port by way of said first groove, said primary operational fluid acting on said third diameter to develop a second pressure differential force to oppose the movement of said second piston means by said second resilient means to restrict the flow of said primary operational fluid through said first groove and create said secondary operational fluid having a fluid pressure $P_{cr}$;

control means responsive to an operational signal for selective connecting a control port with the primary operational fluid and the reference fluid;

load means having a movable wall that separates a first chamber from a second chamber, said first chamber being connected to said control means and said second chamber being connected to said second outlet port, said control means responding to an operational signal to selectively allow primary operational fluid ($P_c$) or reference fluid $P_{(B)}$ to flow to said first chamber to establish a fluid pressure $P_{(x)}$ therein and develop a pressure differential ($P_x-P_{cr}$) across the movable wall, said pressure differential ($P_x-P_{cr}$) acting on said movable wall to modify the fluid pressure $P_{cr}$ in said second chamber to $P_{(crx)}$, said fluid pressure $P_{(crx)}$ being communicated to said second bore to develop a corresponding pressure differential ($P_{crx}-P_B$) across said third diameter and allow said second resilient means to move either the first groove to a position which allows additional primary operational fluid to flow through the entrance port or the second groove to a position which allows secondary operational fluid to flow through the bypass valve until the fluid pressure of the secondary operational fluid returns to $P_{cr}$.

2. The regulator arrangement as recited in claim 1, wherein said first land effectively closes both the entrance port and bypass port when the pressure differential ($P_{cr}-P_B$) across the third diameter of the second piston means is equal to the force of said second resilient means.

3. The regulator arrangement as recited in claim 2 wherein said first pressure differential is produced by the fluid pressure $P_c$ of the primary operational fluid acts on a face of the first diameter of the first piston means.

4. The regulator arrangement as recited in claim 3 wherein said first piston means includes a rib on said first diameter section that engages a shoulder in said first bore to limit the movement of said second diameter with respect to said first seat and to establish the maximum flow through the first outlet port.

5. The regulator arrangement as recited in claim 4, wherein said second bore is connected to said reference fluid by a second reference port adjacent said second land, said bypass port being connected to said second reference port through said second groove as said first land moves to open said bypass port.

6. The regulator arrangement as recited in claim 5 wherein said first land closes said entrance port to said second bore prior to opening of said bypass port to assure that primary operational fluid is not communicated to said second reference port.

7. The regulator arrangement as recited in claim 6 wherein said second piston means further includes:

stop means for engaging said third diameter to limit the movement of the second piston by the pressure differential ($P_{crx}-P_B$) to establish the maximum flow through a bypass valve.

* * * * *